United States Patent [19]

Deng

[11] Patent Number: 5,430,908

[45] Date of Patent: Jul. 11, 1995

[54] WINDSHIELD WIPING SYSTEM WITH WIPER BLADE REVERSAL MECHANISM

[75] Inventor: Xiaoming Deng, Ann Arbor, Mich.

[73] Assignee: Ford Motor Company, Dearborn, Mich.

[21] Appl. No.: 373,331

[22] Filed: Jan. 17, 1995

Related U.S. Application Data

[63] Continuation-in-part of Ser. No. 173,031, Dec. 27, 1993, abandoned.

[51] Int. Cl.⁶ .............................. B60S 1/44; B60S 1/34
[52] U.S. Cl. .............................. 15/250.21; 15/250.33; 15/250.34; 15/250.35
[58] Field of Search ........... 15/250.21, 250.22, 250.23, 15/250.33, 250.35, 250.32, 250.34, 250.31

[56] References Cited

U.S. PATENT DOCUMENTS

| | | | |
|---|---|---|---|
| 2,691,186 | 10/1954 | Oishei et al. | 15/250.21 |
| 2,781,540 | 2/1957 | Deibel | 15/250.21 |
| 2,941,230 | 6/1960 | Scriven et al. | 15/250.21 |
| 3,178,751 | 4/1965 | Wubbe | 15/250.35 |
| 3,292,200 | 12/1966 | Scinta | 15/250.35 |
| 3,405,421 | 10/1968 | Tomlin | 15/250.33 |
| 4,169,298 | 10/1979 | Smith | 15/250.33 |
| 4,800,610 | 1/1989 | Arai et al. | 15/250.21 |
| 4,858,268 | 8/1989 | Shirato | 15/250.21 |
| 4,958,405 | 9/1990 | Kuhbauch | 15/250.33 |

FOREIGN PATENT DOCUMENTS

| | | | |
|---|---|---|---|
| 563743 | 6/1957 | Italy | 15/250.21 |
| 62-116341A | 5/1987 | Japan | 15/250.21 |
| 62-221954A | 9/1987 | Japan | 15/250.22 |

Primary Examiner—Gary K. Graham
Attorney, Agent, or Firm—Mark S. Sparschu; Roger L. May

[57] ABSTRACT

A system for wiping a windshield includes a pivot shaft rotatably connected to a source of oscillatory rotation. The system also includes an arm for positioning a wiper blade against the windshield. The wiper blade forms an angle of inclination with respect to a normal to the windshield. Gears connected to the pivot shaft and to the arm provide reversal of the angle of inclination when rotation of the pivot shaft reverses.

6 Claims, 2 Drawing Sheets

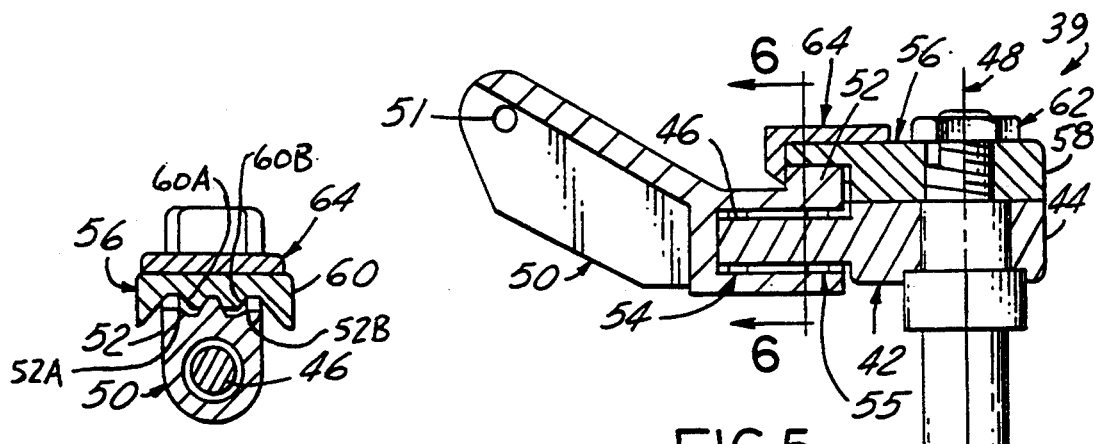
FIG.6
FIG.5
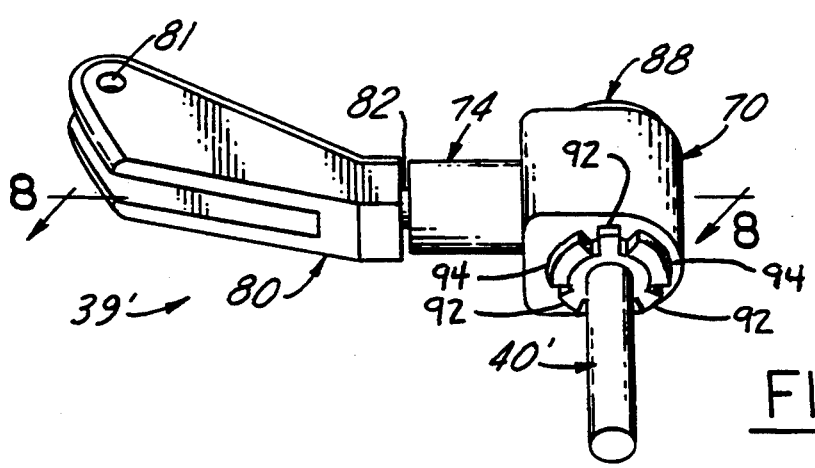
FIG.7
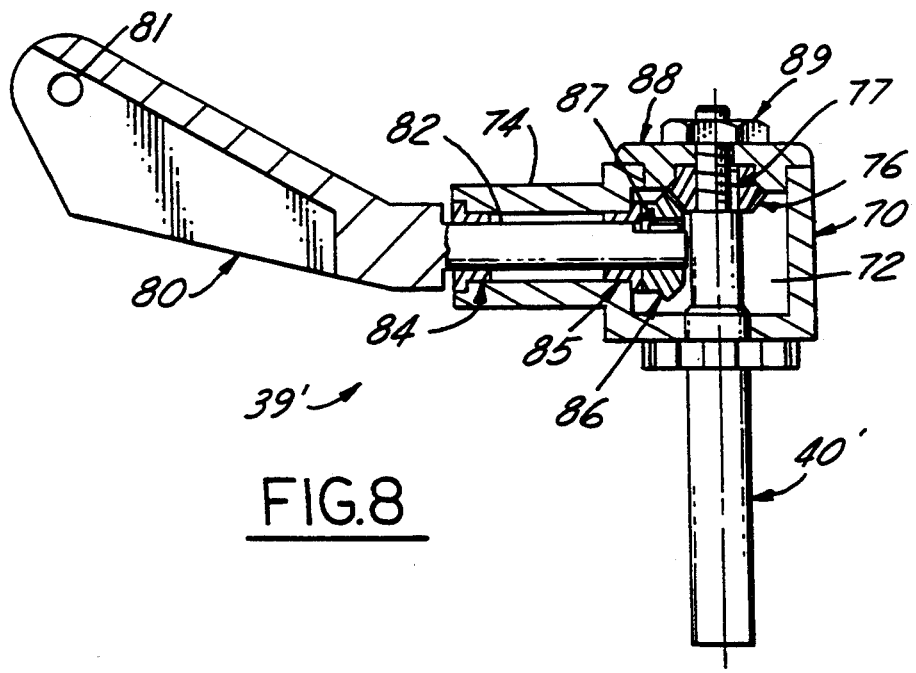
FIG.8

WINDSHIELD WIPING SYSTEM WITH WIPER BLADE REVERSAL MECHANISM

This is a continuation-in-part of my prior application Ser. No. 08/173,031, filed Dec. 27, 1993, now abandoned.

BACKGROUND OF THE INVENTION

1. Field of the Invention

The present invention relates generally to a system for wiping a windshield and more particularly to mechanisms for mounting a wiper blade with respect to a windshield.

2. Description of the Related Art

A typical system for wiping a windshield includes a wiper blade assembly and an arm assembly. The arm assembly is typically mounted to a pivot shaft which is reciprocally rotated by a mechanical linkage connected to a wiper motor. The resulting reciprocal rotation of the arm assembly causes the wiper blade assembly to wipe across the windshield. A second arm assembly with a second wiper blade assembly is frequently provided as well.

A wiper blade assembly typically includes a rubber wiper blade 20, a typical end view of which is shown in FIG. 1. Wiper blade 20 comprises a wiping portion 22, a base 24, and a hinge 26.

Wiper blade 20 is shown in wiping position against a windshield 16 in FIG. 2. For the purposes of this discussion, assume that wiper blade 20 is moving in the direction depicted by arrow 28 in FIG. 2. Because wiper blade 20 reciprocates across windshield 16, wiper blade 20 will also at times move in the direction opposite to direction 28. For minimization of wiper blade "chatter" and to provide advantages in wiping efficiency, it is desirable for wiping portion 22 to assume a positive "attack angle" with windshield 16 when wiper blade 20 is wiping windshield 16. The "attack angle" is denoted as angle α in FIG. 2. The attack angle is the angle of inclination of the axis 30 of wiping portion 22 with respect to a normal 31 to the surface of windshield 16. Attack angle α is considered to be positive when wiping portion 22 is tipped away from the direction of motion (here, 28) of wiper blade 20, as in FIG. 2.

The typical wiper blade 20 in FIG. 2 is able to assume a positive attack angle due to hinge 26. As wiper blade 20 moves in direction 28, hinge 26 allows wiping portion 22 of wiper blade 20 to rotate to a position defining a positive attack angle. When wiper blade 20 reverses direction, hinge 26 allows wiping portion 22 to rotate such that a positive attack angle is re-established, despite the reversal of direction of wiper blade 20.

Although generally effective at maintaining a positive attack angle, a wiper blade employing hinge 26 has at least two disadvantages. First, when wiping portion 22 rotates during reversal of travel of wiper blade 20, a corner 32 or 34 of wiping portion 22 comes into contact with base 24 of wiper blade 20. Because rotation of wiping portion 22 generally occurs quickly and with significant force, the contacting of corner 32 or 34 with base 24 causes considerable noise. This noise can be annoying to persons inside the vehicle. The second disadvantage of a wiper blade employing hinge 26 is manifested during situations in which there is a particularly low coefficient of friction between wiping portion 22 and windshield 16. In such a case, the low friction can be insufficient to facilitate rotation of wiping portion 22 when direction of travel of wiper blade 20 reverses. Wiping portion 22 thus assumes a negative attack angle, which can cause significant chatter against windshield 16 and a considerable reduction in windshield wiping efficiency.

U.S. Pat. No. 4,800,610 discloses a windshield wiper with a gear mechanism to maintain a constant attack angle despite varying curvature of a windshield. However, this invention does not provide reversal of the attack angle between the wiper blade and the windshield. If such reversal is desired, other means must be employed to produce the reversal.

Therefore, a windshield wiping system which provides attack angle reversal in a relatively quiet and reliable manner will provide advantages over the prior art.

SUMMARY OF THE INVENTION

The present invention provides a system for wiping a surface. The system comprises a wiper blade further including a wiping portion having an edge adapted for wiping contact with the surface, the wiping portion defining a plane passing through the edge and generally bisecting the wiping portion. The system further comprises means for positioning the wiper blade against the surface, the positioning means being rotatably mounted about a first axis of rotation such that rotation of the positioning means about the first axis of rotation modifies an angle of inclination between the plane and a normal to the surface to be wiped. Additionally, the system includes first gear means attached to the positioning means and having an axis of rotation coincident with the first axis of rotation. The system also comprises means for transmitting rotation from a rotation source to rotation of the wiper blade about a second axis of rotation. Also, the system includes second gear means, having an axis of rotation coincident with the second axis of rotation, operatively connected to the first gear means for reversing the angle of inclination of the wiper blade when rotation about the second axis reverses direction.

The present invention also provides a system for wiping a windshield. The system comprises a pivot shaft mounted for reversible rotation about a first axis. The system also includes an arm defining a second axis of rotation. Further, the system comprises a wiper blade positioned with respect to the windshield by the arm, the wiper blade further including a wiping portion having an edge adapted for wiping contact with the windshield, the wiping portion defining a plane passing through the edge and generally bisecting the wiping portion, the plane having an angle of inclination with respect to a normal to the windshield. The system also includes a first gear fixed to the pivot shaft for rotation therewith about the first axis of rotation. Additionally, the system comprises a second gear coupled with the first gear and fixed to the arm for rotation therewith about the second axis of rotation. The first gear and the second gear are responsive to reversal of rotation of the pivot shaft about the first axis of rotation for rotating the arm and reversing the angle of inclination.

The present invention provides at least two advantages over the prior art. First, quiet reversal of the angle of inclination of the wiper blade is provided, due to the elimination of the prior art wiper blade hinge previously discussed. In addition, reliable reversal of the angle of inclination is provided even in the event of low friction between the wiper blade and the windshield.

BRIEF DESCRIPTION OF THE DRAWINGS

FIG. 5 is a sectional view of wiper mechanism 39 taken along line 5—5 of FIG. 4.

FIG. 6 is a sectional view taken along line 6—6 of FIG. 5.

FIG. 7 is a perspective view of wiper mechanism 39' according to a second embodiment of the present invention.

FIG. 8 is a sectional view of wiper mechanism 39' taken along line 8—8 of FIG. 7.

DETAILED DESCRIPTION OF THE INVENTION

Figure 1:
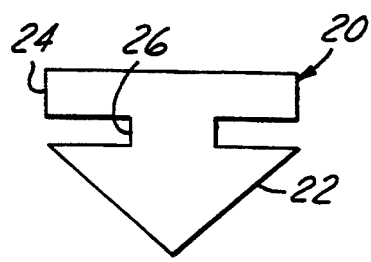
FIG. 1 is an end view of a prior art windshield wiper blade.
Figure 2:
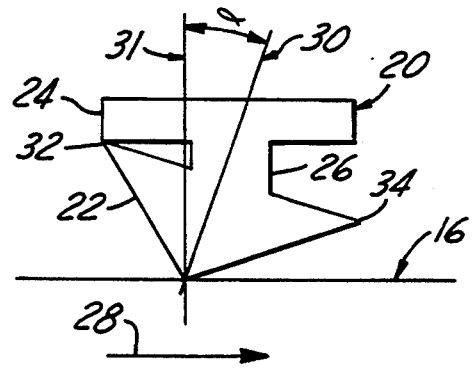
FIG. 2 is an end view of the prior art windshield wiper blade of FIG. 1 in wiping contact with a windshield.
Figure 3:
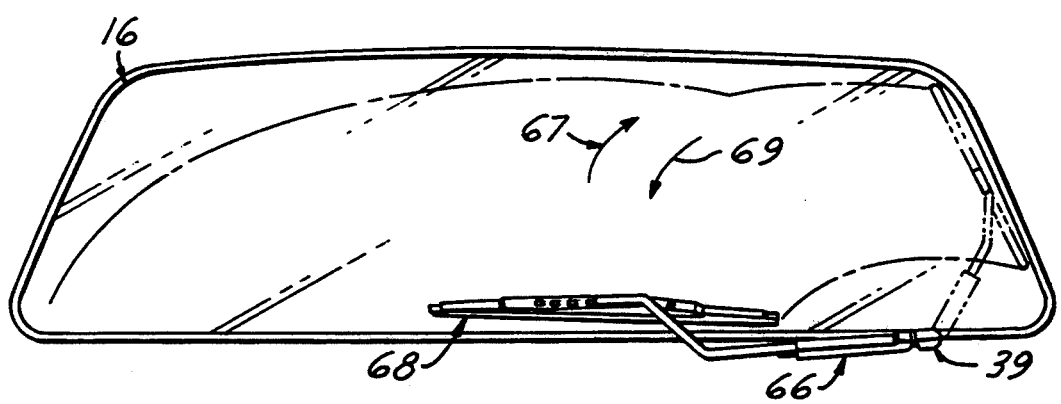
FIG. 3 is a view of a windshield wiping system according to the present invention.

Referring to FIG. 3, a windshield wiping system according to the present invention is illustrated. Arm assembly 66 is attached to wiper mechanism 39. A wiper blade assembly 68 is then attached to arm assembly 66. Wiper blade assembly 68 comprises a wiper blade without hinge 26 illustrated in FIGS. 1 and 2. If windshield 16 is large enough, additional wiper mechanisms, wiper blades, and arm assemblies can be provided such that an adequate portion of windshield 16 is wiped.

Figure 4:
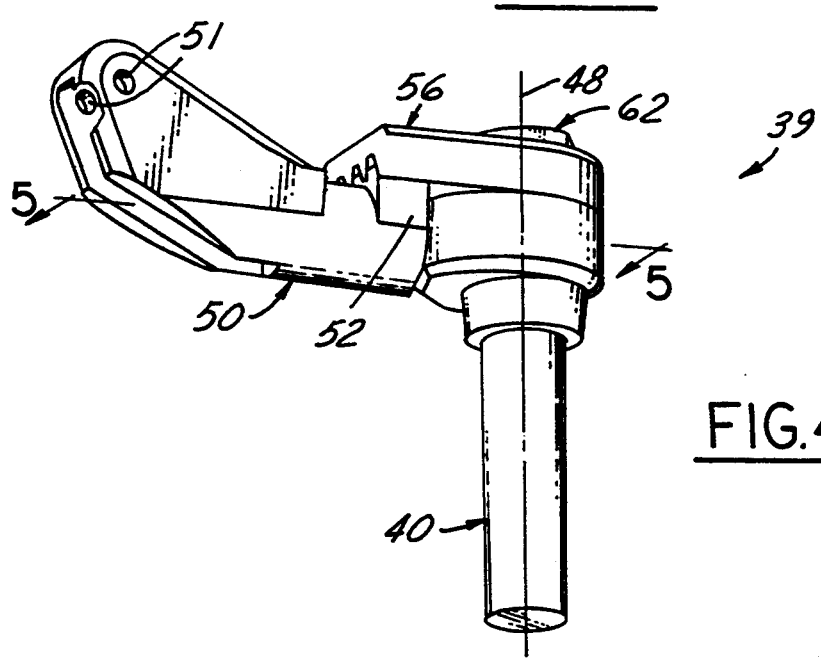
FIG. 4 is a perspective view of wiper mechanism 39 of FIG. 3 according to one embodiment of the present invention.

Referring to FIGS. 4 and 5, wiper mechanism 39 according one embodiment of the present invention is shown. Wiper mechanism 39 comprises a pivot shaft 40. Pivot shaft 40 is connected to a support shaft 42. Support shaft 42 comprises a hub portion 44 and a shaft portion 46. Hub portion 44 is mounted on pivot shaft 42 so as to rotate about axis 48 as pivot shaft 40 rotates about that axis.

Mounted on shaft portion 46 of support shaft 42 is a pinion arm 50. Pinion arm 50 comprises two holes 51 to hold wiper arm 66 (FIG. 3), on which wiper blade assembly 68 (FIG. 3) is retained. Referring additionally to FIG. 6, pinion arm 50 further comprises a pinion gear portion 52 comprising teeth. The mounting of pinion arm 50 on shaft portion 46 of support shaft 42 is such that pinion arm 50 can rotate about the axis of shaft portion 46 of support shaft 42. Bushings 54 and 55 are mounted between shaft portion 46 and pinion arm 50.

Further mounted on pivot shaft 40 is rack cover 56. Rack cover 56 comprises a hub portion 58 which is coaxially located on pivot shaft 40. Rack cover 56 further comprises a rack gear portion 60. Rack gear portion 60 is meshed with pinion gear portion 52 of pinion arm 50.

A nut 62 holds support shaft 42 and rack cover 56 axially and rotationally fast to pivot shaft 40. A retainer 64 (omitted in FIG. 4 for clarity of illustrating rack cover 56) holds pinion arm 50 on support shaft 42.

Pinion shaft 40 is attached to a linkage (not shown), which is further attached to a windshield wiper motor (not shown). The linkage and the wiper motor are of a conventional configuration, well-known to one skilled in the art. The motor and linkage rotate pinion arm 40 in an oscillatory fashion about axis 48.

Referring to FIGS. 3, 4, 5 and 6, the operation of this embodiment of the present invention will be described. Rotation of pivot shaft 40 causes wiper arm 66 to move wiper blade assembly 68 across windshield 16. At the end of movement of wiper arm 66 in direction 67 (the position shown in shadow in FIG. 3), wiper arm 66 reverses direction, beginning to travel in direction 69. When wiper arm 66 reverses direction, rack gear portion 60 drives rotation of pinion gear portion 52. This rotation brings wiper blade assembly 68, which with wiper arm 66 is attached to pinion arm 50, into a positive attack angle with windshield 16 for motion in direction 69. When wiper arm 66 has brought wiper blade assembly 68 back to the position shown in solid in FIG. 3, wiper arm 66 reverses direction again, beginning to travel in direction 67. When this reversal occurs, rack gear portion 60 again drives rotation of pinion gear portion 52. This rotation again brings wiper blade assembly 68 into a positive attack angle for motion in direction 67.

As pinion arm 50 rotates in a clockwise direction as viewed in FIG. 6, its rotation is limited by the contacting of surface 52A of pinion gear portion 52 with surface 60A of rack gear portion 60. Likewise, surfaces 52B and 60B cooperate to limit rotation of pinion arm 50 in the counterclockwise direction as viewed in FIG. 6. Rotation in these two directions is limited so as to effect the desired attack angle of wiper blade assembly 68 as it reciprocates between directions 67 and 69 (FIG. 3).

It should be noted that those with ordinary skill in the art of gear design will recognize the need for limiting rotation of pinion arm 50. Such artisans can devise a myriad of alternate means for limiting rotation of pinion arm 50. Any of such means are appropriate for use in this embodiment of the invention and would not depart from the invention.

Referring now to FIGS. 7 and 8, an alternative configuration 39' of wiper mechanism 39 is shown. Wiper mechanism 39' comprises a pivot shaft 40'. Mounted on pivot shaft 40' is a pivot house 70. Pivot house 70 contains an interior region 72. Pivot house 70 further comprises a tubular section 74.

Within pivot house 70 and mounted on pivot shaft 40' is a first bevel gear 76. First bevel gear 76 is retained on pivot shaft 40' via keying 77 located on pivot shaft 40'. First bevel gear 76 is thus held rotationally fast to pivot shaft 40'.

Arm 80 comprises two holes 81 on which a wiper arm (not shown) is attached. Arm 80 further comprises a shaft 82. Arm 80 is mounted with shaft 82 within tubular section 74 of pivot house 70. Bushings 84 and 85 are mounted between shaft 82 and tubular section 74.

A second bevel gear 86 is mounted on shaft 82 and within pivot house 70. Second bevel gear 86 is retained on shaft 82 via keying 87 located on shaft 82. Second bevel gear 86 is thus held rotationally fast to shaft 82. Second bevel gear 86 is meshed with first bevel gear 76.

A cover 88 encloses interior region 72 of pivot house 70. A nut 89 holds cover 88, second bevel gear 86 and pivot house 70 on pivot shaft 40'.

Pivot shaft 40' further comprises cogs 92. Pivot house 70 further comprises cogs 94. Cogs 92 and 94 cooperate such that pivot shaft 40' is only allowed to rotate independently from pivot house 70 over a limited rotational angle. Only when such independent rotation occurs do bevel gears 76 and 86 cause arm 80 to rotate. Through this cooperation of cogs 92 and 94 in limiting the rotation of arm 80, the attack angle of wiper blade assembly 68 is effected as it reciprocates between directions 67 and 69 (FIG. 3).

Those with ordinary skill in the art of gear design will recognize the need for limiting rotation of arm 80 so as to effect the proper attack angle of wiper blade assembly 68. Such artisans can devise a myriad of alternate means for limiting rotation of arm 80. Any of such means are appropriate for use in this embodiment of the invention and would not depart from the invention.

Various modifications and variations will no doubt occur to those skilled in the arts to which this invention pertains. Such variations which generally rely on the teachings through which this disclosure has advanced the art are properly considered within the scope of this invention.

What is claimed is:

1. A system for wiping a surface, said system comprising:
    a wiper blade further comprising a wiping portion having an edge adapted for wiping contact with said surface, said wiping portion having a plane passing through said edge and generally bisecting said wiping portion;
    means for positioning said wiper blade against said surface at an angle of inclination to a normal to said surface to be wiped, said positioning means being rotatably mounted about a first axis of rotation such that rotation of said means about said first axis of rotation modifies said angle of inclination;
    first gear means attached to said positioning means and having an axis of rotation coincident with said first axis of rotation;
    means for transmitting rotation from a reversible rotation source to reversible rotation of said wiper blade about a second axis of rotation; and
    second gear means, having an axis of rotation coincident with said second axis of rotation, operatively connected to said first gear means for reversing said angle of inclination of said wiper blade when said rotation about said second axis reverses direction.

2. A system as recited in claim 1 wherein said first gear means and said second gear means each comprise a bevel gear.

3. A system as recited in claim 1 wherein said first gear means comprises a rack gear and said second gear means comprises a pinion gear.

4. A system for wiping a windshield surface, said system comprising:
    a pivot shaft mounted for reversible rotation about a first axis;
    an arm pivotally mounted to said shaft for rotation about a second axis of rotation;
    a wiper blade coupled to said arm and positioned with respect to said windshield surface by said arm, said wiper blade further comprising a wiping portion having an edge adapted for wiping contact with said windshield surface, said wiping portion having a plane passing through said edge and generally bisecting said wiping portion, said plane having an angle of inclination with respect to a normal to said windshield surface;
    a first gear fixed to said pivot shaft for rotation therewith about said first axis of rotation; and
    a second gear coupled with said first gear and fixed to said arm for rotation therewith about said second axis of rotation;
    said first gear and said second gear responsive to reversal of rotation of said pivot shaft about said first axis of rotation for rotating said arm and reversing said angle of inclination.

5. A system as recited in claim 4, wherein said first gear is a rack gear and said second gear is a pinion gear.

6. A system as recited in claim 4, wherein said first gear and said second gear are each a bevel gear.

* * * * *